(12) United States Patent
Beller et al.

(10) Patent No.: US 10,936,819 B2
(45) Date of Patent: Mar. 2, 2021

(54) QUERY-DIRECTED DISCOVERY AND ALIGNMENT OF COLLECTIONS OF DOCUMENT PASSAGES FOR IMPROVING NAMED ENTITY DISAMBIGUATION PRECISION

(71) Applicant: INTERNATIONAL BUSINESS MACHINES CORPORATION, Armonk, NY (US)

(72) Inventors: Charles E. Beller, Baltimore, MD (US); Christopher F. Ackermann, Fairfax, VA (US); Michael Drzewucki, Woodbridge, VA (US); Andrew Doyle, Mount Rainier, MD (US); Edward G. Katz, Washington, DC (US); Kristen M. Summers, Takoma Park, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

(21) Appl. No.: 16/278,805

(22) Filed: Feb. 19, 2019

(65) Prior Publication Data

US 2020/0265114 A1    Aug. 20, 2020

(51) Int. Cl.
*G06F 40/295* (2020.01)
*G06F 16/242* (2019.01)
(Continued)

(52) U.S. Cl.
CPC .......... *G06F 40/295* (2020.01); *G06F 16/243* (2019.01); *G06F 16/24578* (2019.01); *G06F 16/93* (2019.01); *G06N 5/046* (2013.01)

(58) Field of Classification Search
CPC ...... G06F 40/295; G06F 16/243; G06F 16/93; G06F 16/24578; G06N 5/046
See application file for complete search history.

(56) References Cited

U.S. PATENT DOCUMENTS 6,263,364 B1    7/2001  Najork et al.
6,438,543 B1    8/2002  Kazi et al.
(Continued)

OTHER PUBLICATIONS

"List of IBM Patents or Patent Applications Treated as Related", dated Mar. 19, 2019, 2 pages.
(Continued)

*Primary Examiner* — Mohammad K Islam
(74) *Attorney, Agent, or Firm* — Feb R. Cabrasawan; Amy J. Pattillo

(57) ABSTRACT

A query system identifies a collection of discovered entity bins each comprising unstructured documents with mentions of a name element from a name query and each identified with a particular named entity identifiable from the name element. The query system identifies, from a knowledge base of structured documents, based on identifier components with the name element, candidate records identifying the respective identifier components with the name element, the one or more identifier components identified among the discovery entity bins. For each respective selection of candidate records associated with each bin, the query system applies one or more alignment threshold rules to rank the likelihood that each candidate record within each respective selection matches one or more characteristics of the respective discovery entity bin. The query system aligns, with each of the discovery entity bins, a highest ranked record from among each respective selection of candidate records, where the respective aligned highest ranked record identifies a distinct named entity from among the named entities.

20 Claims, 6 Drawing Sheets

(51) Int. Cl.
  *G06N 5/04* (2006.01)
  *G06F 16/93* (2019.01)
  *G06F 16/2457* (2019.01)

(56) References Cited

U.S. PATENT DOCUMENTS

| | | | |
|---|---|---|---|
| 6,564,210 | B1 | 5/2003 | Korda et al. |
| 6,594,658 | B2 | 7/2003 | Woods |
| 8,219,557 | B2 | 7/2012 | Grefenstette et al. |
| 8,538,989 | B1 | 9/2013 | Datar et al. |
| 8,561,185 | B1 | 10/2013 | Muthusrinivasan et al. |
| 9,092,989 | B2 | 7/2015 | Agarwal et al. |
| 9,348,915 | B2 | 5/2016 | Iwasa et al. |
| 9,619,457 | B1 | 4/2017 | Gillick et al. |
| 9,679,018 | B1 | 6/2017 | Yuksel et al. |
| 10,268,641 | B1* | 4/2019 | Guha ............ G06F 16/951 |
| 10,474,708 | B2* | 11/2019 | Roberts ........ G06F 16/9032 |
| 10,599,732 | B2* | 3/2020 | Hassanzadeh .. G06F 16/9535 |
| 10,621,183 | B1* | 4/2020 | Chatterjee ...... G06F 16/334 |
| 10,664,660 | B2* | 5/2020 | Li .................. G06F 40/295 |
| 2005/0027681 | A1* | 2/2005 | Bernstein ........ G06F 16/86 |
| 2005/0154761 | A1 | 7/2005 | Lee et al. |
| 2006/0095473 | A1* | 5/2006 | Fox ................ G06Q 10/10 |
| 2007/0022072 | A1 | 1/2007 | Kao et al. |
| 2008/0140616 | A1* | 6/2008 | Encina .......... G06F 16/31 |
| 2008/0222105 | A1 | 9/2008 | Matheny |
| 2009/0254512 | A1 | 10/2009 | Broder et al. |
| 2011/0035374 | A1 | 2/2011 | Vadrevu et al. |
| 2012/0078888 | A1 | 3/2012 | Brown et al. |
| 2012/0089622 | A1 | 4/2012 | Fan et al. |
| 2013/0173639 | A1 | 7/2013 | Chandra et al. |
| 2014/0074826 | A1 | 3/2014 | Cooper et al. |
| 2014/0222792 | A1 | 8/2014 | Groeneveld et al. |
| 2015/0074081 | A1* | 3/2015 | Falter ............ G06F 16/288 707/713 |
| 2015/0154316 | A1 | 6/2015 | Lightner et al. |
| 2015/0370859 | A1 | 12/2015 | Bakir et al. |
| 2016/0012126 | A1 | 1/2016 | Franceschini et al. |
| 2016/0078038 | A1 | 3/2016 | Solanki et al. |
| 2016/0147871 | A1 | 5/2016 | Kalyanpur et al. |
| 2016/0357857 | A1 | 12/2016 | Langmead et al. |
| 2017/0060856 | A1 | 3/2017 | Turtle et al. |
| 2017/0124075 | A1 | 5/2017 | Deng |
| 2017/0161615 | A1 | 6/2017 | Gordon et al. |
| 2017/0228372 | A1 | 8/2017 | Moreno et al. |
| 2017/0277668 | A1 | 9/2017 | Luo et al. |
| 2017/0323019 | A1 | 11/2017 | Hall |
| 2017/0351752 | A1 | 12/2017 | Meehan et al. |
| 2017/0364519 | A1 | 12/2017 | Beller et al. |
| 2017/0364804 | A1 | 12/2017 | Beller et al. |
| 2018/0052817 | A1 | 2/2018 | Bethard et al. |
| 2018/0089307 | A1 | 3/2018 | Cohen et al. |
| 2019/0278777 | A1* | 9/2019 | Malik ............ G06F 16/367 |
| 2020/0034370 | A1* | 1/2020 | Barron .......... G06F 16/248 |
| 2020/0183995 | A1* | 6/2020 | Hassanzadeh .. G06F 16/273 |
| 2020/0210647 | A1* | 7/2020 | Panuganty ..... G06F 16/24578 |
| 2020/0265042 | A1 | 8/2020 | Beller et al. |
| 2020/0265054 | A1 | 8/2020 | Summers et al. |

OTHER PUBLICATIONS

Alam et al., "Structured and Unstructured Document Summarization: Design of a Commercial Summarizer using Lexical Chains", Proceedings of the Seventh International Conference on Document Analysis and Recognition, Jan. 2003, 7 pages.

Benton et al., "Faster (and Better) Entity Linking with Cascades", accessible via the Internat at <http://www.cs.jhu.edu/%7Emdredze/publications/2014_nips_slinky_cascades.pdf>, 6 pages.

Jayaram et al, "Querying Knowledge Graphs by Example Entity Tuples", 2014 IEEE 30th International Conference on Data Engineering, 2014, 16 pages.

Non-final Office Action, dated Sep. 25, 2020, U.S. Appl. No. 16/278,856, filed Feb. 19, 2019.

No author, "Cluster Analysis", Wikipedia, accessed online from <https://en.wikipedia.org/wiki/Cluster_analysis> as of Oct. 1, 2020, 21 pages.

Non-Final Office Action, dated Oct. 5, 2020, U.S. Appl. No. 16/279,650, filed Feb. 19, 2019.

\* cited by examiner

QUERY-DIRECTED DISCOVERY AND ALIGNMENT OF COLLECTIONS OF DOCUMENT PASSAGES FOR IMPROVING NAMED ENTITY DISAMBIGUATION PRECISION

This invention was made with United States Government support under contract number 2013-12101100008. The Government has certain rights in this invention.

BACKGROUND

1. Technical Field

This invention relates in general to natural language processing and more particularly to query-directed discovery and alignment of collections of document passages for improving named entity disambiguation precision.

2. Description of the Related Art

With the increased usage of computing networks, such as the Internet, the amount of information available from structured and unstructured sources has also increased.

BRIEF SUMMARY

In one embodiment, a method is directed to receiving, by a computer system, a collection of a plurality of discovered entity bins, each of the plurality of discovered entity bins comprising one or more unstructured documents each comprising one or more mentions of a name element from a name query, each of the plurality of discovered entity bins identified with a particular named entity from among a plurality of named entities identifiable from the name element. The method is directed to identifying, by the computer system, from a knowledge base of a plurality of structured documents, for each of one or more identifier components with the name element, a plurality of candidate records identifying the respective one or more identifier components with the name element, the one or more identifier components identified among the plurality of discovery entity bins. The method is directed to applying, by the computer system, for each respective selection of the plurality of candidate records associated with each of the plurality of discovered entity bins, one or more alignment threshold rules to rank the likelihood that each candidate record within each respective selection matches one or more characteristics of the respective discovery entity bin. The method is directed to aligning, by the computer system, with each of the plurality of discovery entity bins, a highest ranked record from among each respective selection of the plurality of candidate records. The method is directed to outputting, by the computer system, the plurality of discovered entity bins each annotated with the respective aligned highest ranked record identifying a distinct named entity from among the plurality of named entities.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a collection of a plurality of discovered entity bins, each of the plurality of discovered entity bins comprising one or more unstructured documents each comprising one or more mentions of a name element from a name query, each of the plurality of discovered entity bins identified with a particular named entity from among a plurality of named entities identifiable from the name element. The stored program instructions comprise program instructions to identify, from a knowledge base of a plurality of structured documents, for each of one or more identifier components with the name element, a plurality of candidate records identifying the respective one or more identifier components with the name element, the one or more identifier components identified among the plurality of discovery entity bins. The stored program instructions comprise program instructions to apply, for each respective selection of the plurality of candidate records associated with each of the plurality of discovered entity bins, one or more alignment threshold rules to rank the likelihood that each candidate record within each respective selection matches one or more characteristics of the respective discovery entity bin. The stored program instructions comprise program instructions to align, with each of the plurality of discovery entity bins, a highest ranked record from among each respective selection of the plurality of candidate records. The stored program instructions comprise program instructions to output the plurality of discovered entity bins each annotated with the respective aligned highest ranked record identifying a distinct named entity from among the plurality of named entities.

In another embodiment, a computer program product comprises a computer readable storage medium having program instructions embodied therewith, wherein the computer readable storage medium is not a transitory signal per se. The program instructions are executable by a computer to cause the computer to receive, by a computer, a collection of a plurality of discovered entity bins, each of the plurality of discovered entity bins comprising one or more unstructured documents each comprising one or more mentions of a name element from a name query, each of the plurality of discovered entity bins identified with a particular named entity from among a plurality of named entities identifiable from the name element. The program instructions are executable by a computer to cause the computer to identify, by the computer, from a knowledge base of a plurality of structured documents, for each of one or more identifier components with the name element, a plurality of candidate records identifying the respective one or more identifier components with the name element, the one or more identifier components identified among the plurality of discovery entity bins. The program instructions are executable by a computer to cause the computer to apply, by the computer, for each respective selection of the plurality of candidate records associated with each of the plurality of discovered entity bins, one or more alignment threshold rules to rank the likelihood that each candidate record within each respective selection matches one or more characteristics of the respective discovery entity bin. The program instructions are executable by a computer to cause the computer to align, by the computer, with each of the plurality of discovery entity bins, a highest ranked record from among each respective selection of the plurality of candidate records. The program instructions are executable by a computer to cause the computer to output, by the computer, the plurality of discovered entity bins each annotated with the respective aligned highest ranked record identifying a distinct named entity from among the plurality of named entities.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
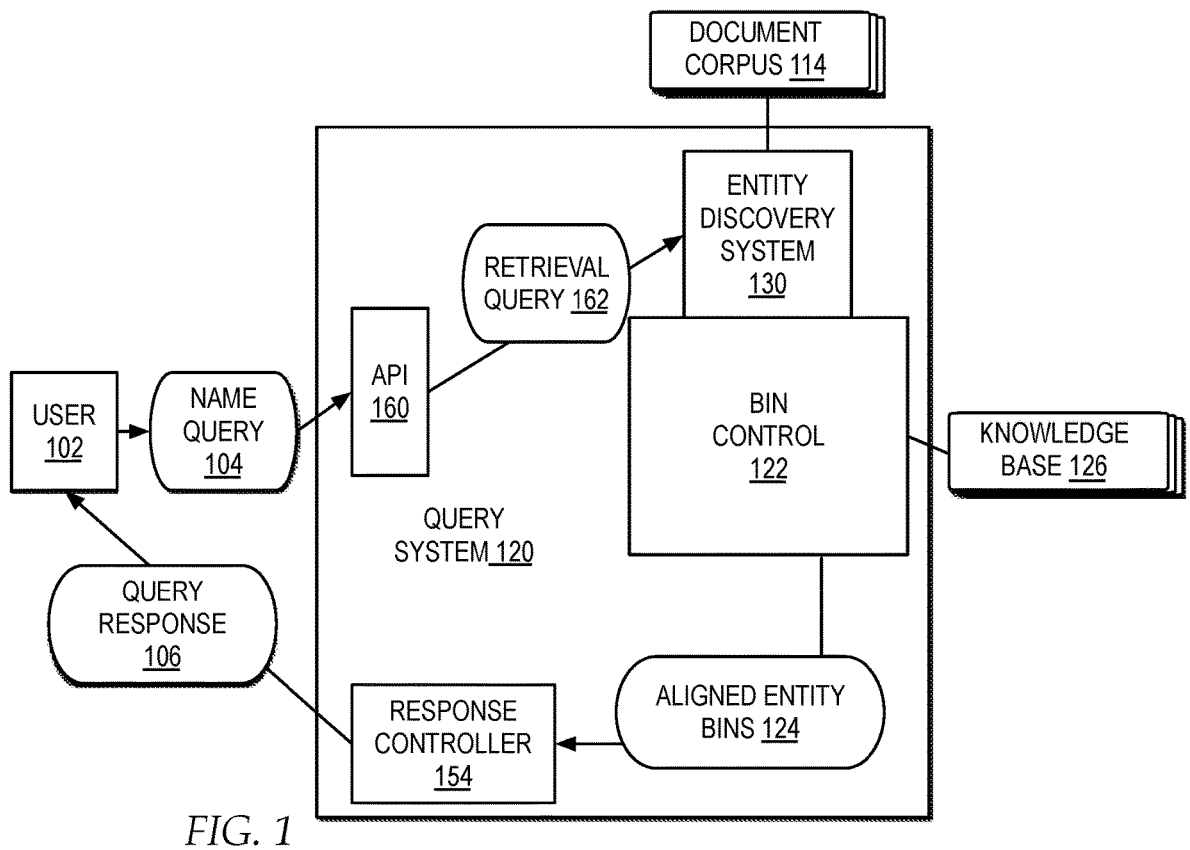
FIG. 1 is a block diagram illustrating one example of a query system for managing query-directed discovery of collections of documents associated with one or more named entities into bins and correct alignment of each bin with a particular named entity for improving named entity disambiguation precision.

FIG. 1 illustrates a block diagram of one example of a query system for managing query-directed discovery of collections of documents associated with one or more named entities into bins and correct alignment of each bin with a particular named entity for improving named entity disambiguation precision.

In one example, a user 102 submits a name query 104 to a query system 120. In one example, query system 120 implements one or more application programming interfaces (APIs), such as API 160, for receiving and responding to name queries.

In the example, query system 120 takes an input of name query 104 through API 160 and submits name query 104 to an entity discovery system 130 of query system 120 as a retrieval query 162 for searching in a corpus of unstructured text documents, illustrated as document corpus 114, through a retrieval query 162. In one example, structured data may refer to data that generally resides in a relational database and includes clearly defined data types that are easily searchable. In one example, unstructured text documents may refer to data that is not structured by a predefined data model or schema or not stored in a relational database. For example, unstructured data in document corpus 114 may include, but is not limited to, text files, emails, social media data, website data, text messages and other textual communications, media, and documents. In one example, the unstructured text documents included in document corpus 114 may have annotations for conference chains within the document, where the conference chains identify relationships between words in unstructured text. In additional embodiments, document corpus 114 may also include structured documents.

In one example, name query 104 includes one or more types of query elements, including at least a name component. The name component identifies one or more types of name elements, and may include a single word or a string of words. The name elements in name query 104 may refer to multiple real-world entities identifiable by a same name. The term "entity" may refer to one or more of people, places, companies, events, and concepts identifiable by the name element in name query 104 and referred to in mentions in one or more documents.

In the example, entity discovery system 130 expands the reach of the name element searched in document corpus 114 to retrieve a large initial set of responses of documents from among the collection of documents in document corpus 114 with mentions of the name element in retrieval query 162. In one example, in retrieving the large initial set of responses, entity discovery system 130 locates and classifies mentions of the name element in unstructured text into categories that may or may not be predefined, but are assumed to correspond to different real-world entities that share a common name. For example, a query for a particular name may result in discovery of two groups of discovered documents, where a first group refers to a first real-world entity from a first country with a first occupation and a second group refers to a second real-world entity from a second country with a second occupation. In another example, entity discovery system 130 may evaluate one or more of additional person names, organizations, occupations, locations, temporal expressions, and numerical expressions when initially identifying different groups of documents that are each assumed to correspond to different real world-entities that share a common name.

If all the documents discovered with the name element in name query 104 by entity discovery system 130 are returned to the user in response to name query 104, the user may receive a volume of information with mentions of the name element, but then have to search through the volume of documents for each mention, read the documents containing each mention, and individually evaluate whether the mention relates to a target named entity the user intended to search for. The process of a user reading through hundreds or thousands of documents is time consuming, and the user may read large volumes of documents in the process that do not relate to the target named entity the user intended to search for. In addition, if the name element in name query 104 includes a common name, a query for that common name may result in a large volume of documents that all include mentions of the common name, but different mentions across the documents may refer to multiple separate name entities.

For many applications, the problem of discovering the mentions in a document collection that refer to the same real-world entity and aligning that information with an external resource to improve the precision of disambiguation of the particular named entity associated with a document collection is important for improving the performance of named entity recognition in response to a user query. For example, a user submitting a query to review information about an applicant may submit a name of the applicant and request information. An initial collection of data searched for identifying information related to the name may include searching an unstructured document corpus that includes a name and two additional types of information, such as a current employer and licensing type, which may return multiple documents for a same name. An external source of data, such as a knowledge base, may include additional types of data. According to an advantage of the present invention, query system 120 discovers entities in unstructured text based on name query 104 and clusters documents associated with different identities of different named entities into collections, or entity bins, and may label each entity bin according to the identity reflected, to disambiguate the named entity associated with each bin. In addition, according to an advantage of the present invention, in addition to discovering entity bins, query system 120 also aligns the discovered entities in each entity bin with ranked entity records from an external structured source of records, such as a knowledge base, identifying particular named entities, providing fine-grained, more precise, named entity recognition that disambiguates the identifies of particular named entities of interest to a user's analytic focus in name query 104. In particular, query system 120 performs entity bin discovery independent of entity bin alignment to an external structured source, such that not only may unstructured data be used for entity discovery and an external structured source be used for alignment, but the types of data used in queries for each data source are different and different queries are generated for each type of data source.

In the example, a bin control 122 of query system 120 identifies, from the large initial set of responses of documents by entity discovery system 130 that each include a mention of the name element, a separate entity bin for each single document. In the example, initially, each entity bin may be represented as a name and the single document in its document collection. In the example, a document may represent a string of data evaluated for one or more types and relationships.

In the example, bin control 122 next identifies features in each pair of entity bins, to determine a degree of similarity of each pairing of entity bins identified. If a degree of similarity between a pair of entity bins reaches a threshold, bin control 122 merges the pair of entity bins into a single entity bin. The result of bin control 122 assessing the degree of similarity of each pairing of entity bins and merging pairs of entity bins with a degree of similarity reaching a threshold results in a collection of discovered entity bins, with a level of named entity disambiguation. For example, each merged collection of documents in each entity bin may reflect a distinct named entity from among multiple distinct named entities associated with a particular name element in name query 104.

Next, bin control 122 performs additional analysis on the collection of discovered entity bins to improve the precision of the named entity disambiguation by aligning each of the discovered entity bins with a particular named entity. In one example, bin control 122 searches for and extracts any elements within each discovered entity bin that are of an identifier component type. Identifier component types include, but are not limited to, information that is more likely to uniquely identify a particular entity associated with a name component, such as, but not limited to, an email address, a mailing address, a phone number, a license number, and other entity-specific identifiers.

In the example, bin control 122 then submits the extracted identifier components and the name element from name query 104 to a knowledge base 126 to retrieve a collection of candidate entity records associated with each identifier component from a particular entity bin. In one example, a knowledge base 126 refers to a structured database of one or more records that each provide identifying information about a particular named entity. For example, Wikipedia.com and Google's Knowledge Graph are each examples of publicly-available structured knowledge bases that contain structured text based records that provide identifying information about particular named entities. In another example, a user may collect or generate a proprietary structured knowledge base that is limited to authorized clients and contains structured text based records that provide identifying information about particular named entities. For example, a company may generate a proprietary structured knowledge base of information about a selection of clients that is verified by the company and then applied in knowledge base 126 to enable the company to more accurately perform high-precision named entity disambiguation during web searches that return large volumes of unstructured documents identified by a search engine for a name element. According to an advantage of the present invention, bin control 122 may dynamically select from among one or more structured knowledge bases for a particular query, for a particular client, or for a particular application, such that bin control 122 is not limited to a predefined structured knowledge base or a particular structured knowledge base used for alignment. In one example, a user query may specify a particular structured knowledge base or selection of structure knowledge bases. In another example, bin control 122 may evaluate one or more structured knowledge bases for alignment with a particular type of name element in user query 104, such as selecting one available structured knowledge base for name elements that are names of individuals and another available structured knowledge base for name elements are names of companies. In another example, each client receiving query system 120 as a query service may selectively specify one or more preferred structured knowledge bases from among multiple available structured knowledge bases.

In one embodiment, bin control 122 ranks the candidate entity records by similarity to the particular entity bin and from among a highest ranking candidate entity record that also exceeds a threshold, identifies any ranked entity record by entity bin. Bin control 122 then aligns each entity bin with a respective ranked entity record by annotating the respective entity bin with information from the ranked entity record. The resulting discovered entity bins, annotated with information from the ranked entity records, are output by bin control 122 as aligned entity bins 124. A response controller 154 of query system 120 formats aligned entity bins 124 into a query response 106 and returns query response 106 to user 102.

In another embodiment, bin control 122 ranks the candidate records by similarity to the particular entity bin and aligns each entity bin with a selection of ranked candidate records by annotating the respective entity bin with information about the ranked matching candidate records by entity bin. The resulting discovered entity bins, annotated with information of the ranked matching list of entity records, are output by bin control 122 as aligned entity bins 124. A response controller 154 of query system 120 formats aligned entity bins 124 into a query response 106 and returns query response 106 to user 102. By annotating each entity bin with the selection of ranked matching candidate records discovered for the entity bin, the query result returned to the user by query system 120 may include the ranked list of matching candidate records discovered for an entity bin, instead of only the highest ranked candidate entity record. The user receiving the query result with one or more entity bins, each with a respective ranked list of matching candidate records may utilize each respective ranked list of matching candidate records for one or more purposes including, but not limited to, additional analysis or evaluation of the respective ranked list of matching candidate records.

In one example, in submitting the extracted identifier components and the name element from name query 104 to knowledge base 126 to retrieve a collection of candidate entity records, bin control 122 formats the query to knowledge base 126 to meet the query rules for knowledge base 126. In one example, the query rules for entity discovery system 130 to search document corpus 114 may differ from the query rules for bin control to search knowledge base 126. An advantage of the present invention is that by performing bin discovery through documents retrieved from document corpus 114 independent of bin alignment through records retrieved from knowledge base 126, query system 120 has a flexibility to access different types of data sources, in different formats, and to align the data from each of the different types of data sources with a distinct named entity, which facilitates efficient customization of the data sources accessed by query 120 for the independent steps of bin discovery and bin alignment.

In the example, given the amount of unstructured data potentially available in document corpus 114, an advantage of the present invention is that query system 120 allows user queries to drive cross-document entity co-referencing and entity alignment for user selected name elements, minimizing the network footprint and storage requirements of a system for performing high-precision named entity disambiguation. In the example, while query system 120 may store the resulting discovered entity bins, annotated with information from the ranked candidate records, for use in evaluating subsequent user searches for a same or similar name component, given the almost unlimited number of name elements that could be presented in a user query and the vast array of unstructured data available for searching via a network, the process of performing high-precision named entity disambiguation in response to a user query, focuses the resources applied for performing this process to only those name elements that are of interest to users submitting queries, for efficient uses of system resources. In contrast, a system that preemptively performs high-precision named entity disambiguation for name elements may preemptively employ extensive system resources for discovery and alignment of entity bins, for named entities that are not ever requested by users or where the body of information about an entity is changing at a frequency that leads to outdated or incomplete information in preemptively gathered entity bins.

Figure 2:
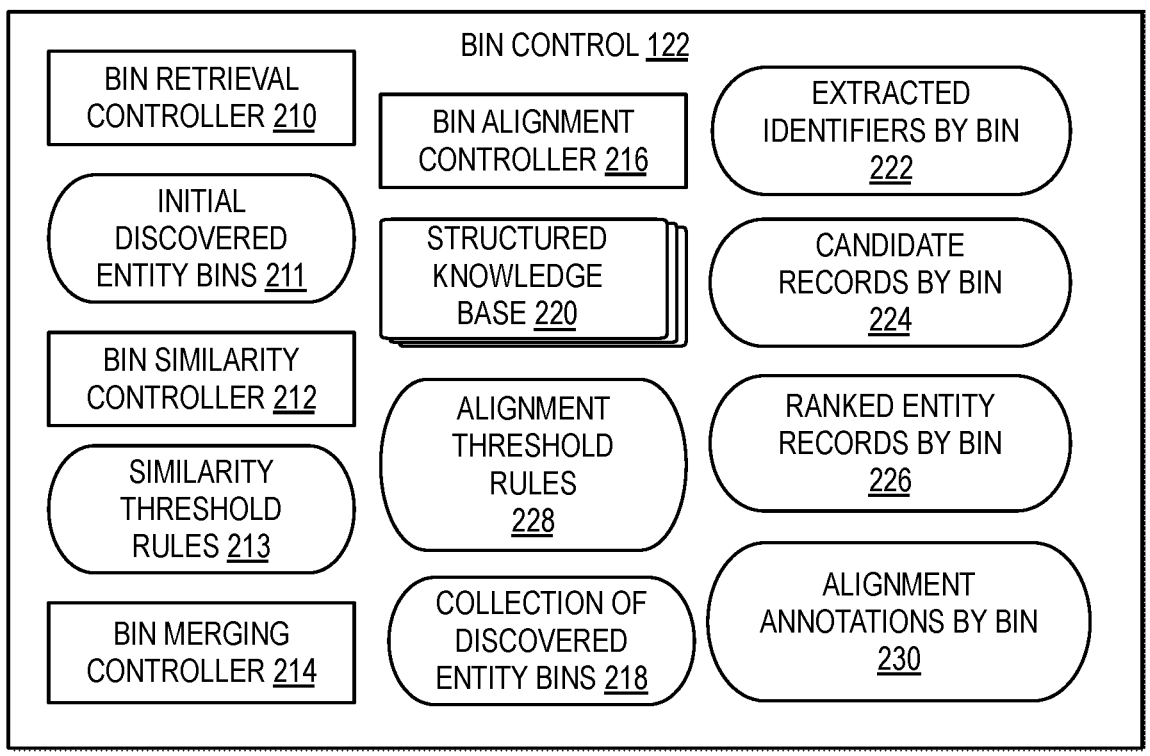
FIG. 2 is a block diagram illustrating one example of bin control for managing discovery of consolidated collections of document passages associated with an entity name in entity bins and alignment of entity bins to structured data sources for improving named entity disambiguation precision.

FIG. 2 illustrates a block diagram of one example of bin control for query-directed discovery of consolidated collections of document passages associated with an entity name in entity bins and alignment of entity bins to structured data sources for improving named entity disambiguation precision.

In one example, bin control 122 implements bin retrieval controller 210 for collecting initial discovered entity bins 211. In one example, each entity bin in initial discovered entity bins 211 is represented by a name and includes a single unstructured document identified from document corpus 114 that include one or more mentions of the name element in name query 104. In one example, the name assigned to a particular entity bin is drawn from the name component of name query 104 as matched to a string in the unstructured document in the entity bin. For example, for a query name component of "Fred Smith", if the single unstructured document collected in an entity bin includes a mention of a variation of the name component of "Freddy Smith', then bin control 122 assigns the name "Freddy Smith" to the particular entity bin. In additional or alternate examples, bin control 122 assigns the name to the particular bin based on other text identified within the unstructured document in the entity bin.

In one example, bin similarity controller 212 determines a degree of similarity for each pair of entity bins in initial discovered entity bins 211. In one example, bin similarity controller 212 applies one or more similarity threshold rules 213 for determining a degree of similarity based on one or more characteristics of each entity bin. For example, similarity threshold rules 213 include one or more rules for determining a degree of similarity include, but are not limited to, identifying similarity or distance metrics on the names of a pair of entity bins, on the passages of text within a pair of entity bins, and on the relationships identified by categories identified in the documents within the two entity bins.

In one example, the degree of similarity applied by bin similarity controller 212 may be specified in similarity threshold rules 213 by different thresholds for application by different service instances of query system 120 or for application to specific queries. For example, a client receiving query system 120 as a service may request that the service apply a threshold for similarity that is higher than a general threshold applied by the service for all or particular types of queries submitted by the client, where the service provider may adjust the cost of the service based on the threshold level applied for similarity determinations. In another example, a user submitting user query 104 may specify, in an additional selectable field of user query 104, a numerical value for a similarity threshold, where query system 120 may dynamically adjust the similarity threshold applied by bin similarity controller 212 to a requested level for the particular query.

In the example, bin merging controller 214 manages merging pairs of entity bins with a degree of similarity meeting a threshold by merging the documents from the two entity bins into a single entity bin. In one example, if the names of the two entity bins that are merged differ, bin merging controller 214 selects one of the names as the name for the merged entity bin. In one example, bin merging controller 214 may also add the non-selected name to a collection of alternate names for the merged entity bin. In additional or alternate examples, bin merging controller 214 may apply additional or alternate methods of merging entity bins into distinct subsets or clusters of documents based on similarities to create distinct sets of documents in each entity bin that are more similar in some way to each other than to distinct sets of documents in other entity bins. In addition, in additional or alternate examples, bin merging controller 214 may select to identify and merge one selection of passages of documents from a pair of entity bins into one merged bin and merge another selection of passages of documents from a pair of entity bins into another merged entity bin.

In one example, bin merging controller 214 manages merging of each set of initial pairs of entity bins in initial discovered entity bins 211. In one example, bin similarity controller 212 also iteratively compares pairs of merged entity bins and bin merging controller 214 also iteratively manages an additional merging of pairs of previously merged entity bins with a degree of similarity meeting a threshold and manages name selection of merged pairs of previously merged entity bins.

In one example, bin merging controller 214 produces collection of discovered entity bins 218 based on completing all merge decisions between pairs of entity bins. In one example, collection of discovered entity bins 218 represents cross-document co-reference entity resolution, where each entity bin in discovered entity bins 218 may identify, with a degree of probability, a particular named entity in the mentions of the name in documents within the entity bin, from among multiple named entities that may share a same name.

In one example, bin control 122 improves the precision of the degree of probability that each entity bin is associated with a particular named entity by aligning each entity bin with structured records in an external knowledge base 126 that are each associated with the particular named entity. In the example, bin alignment controller 216 performs bin alignment by extracting one or more identifier components present in each entity bin in discovered entity bins 218 into extracted identifiers by bin 222. For example, each entity bin in discovered entity bins 218 includes a collection of documents, each with one or more mentions of the name component for the target named entity. Identifier components may include one or more categories of data that are more likely to uniquely identify the target named entity, such as, but not limited to, email addresses, phone numbers, and other uniquely identifying information.

Next, bin alignment controller 216 searches knowledge base 126 with a query, for each entity bin or a single query for all entity bins, for the name component and extracted identifiers by bin 222. In one example, the particular selection of structured data queried as knowledge base 126 may be specified for a particular service, a particular client, or by query. In one example, a particular service provider of service instances of query system 120 may specify one or more trusted structured knowledge base sources and may further specify different selections of trusted structured knowledge base sources for different classifications of name component or identifier components. In another example, user query 104 may include an additional selectable field for specifying an identifier for a selection of trusted structure knowledge base sources to search for the particular search query.

In one example, in response to the query to structured knowledge base 126, bin alignment controller 216 receives a selection of candidate records by bin that match one or more of the provided identifier components in the query parameters, collected as candidate records by bin 224. Bin alignment controller 216, for each entity bin in collection of discovered entity bins 218, compares the selection of candidate records for that entity bin with the entity bin to evaluate the candidate record that best matches the entity bin. In one example, bin alignment controller 216 may apply one or more selections of alignment threshold rules 228 to determine which candidate record best matches an entity bin. For example, bin alignment controller 216 may apply a rule in alignment threshold rules 228 that evaluates a best match score based on a combination of frequency of matches and category of identifier component in the most frequent matches, applying different weights to different categories of identifier components.

In one embodiment, bin alignment controller 216 also applies an alignment threshold in alignment threshold rules 228 to determine whether a best match score exceeds the threshold and qualifies for alignment. Among the scores qualifying for alignment, bin alignment controller 216 selects any highest ranked candidate record by entity bin and filters the selection of candidate records into ranked entity records by bin 226. In the example, each record by entity bin in ranked entity records by bin 226 identifies a particular named entity.

Bin alignment controller 216 finally selects, among ranked entity records by bin 226, to annotate each entity bin in collection of discovered entity bins 218 with an entry in alignment annotations by bin 230, identifying a record selected for the entity bin from ranked entity records by bin 226. In the example, if no candidate record score for a particular entity bin meets or exceeds the alignment threshold and therefore there is no candidate record for the particular entity bin in ranked entity records by bin 226, bin alignment controller 216 does not assign an annotation to the particular entity bin in alignment annotations by bin 230.

In another embodiment, bin alignment controller 216 applies one or more rules in alignment threshold rules 228 to score and rank a selection of candidate records discovered for each respective entity bin into a respective list of ranked matching candidate records. Bin alignment controller 216 annotates each entity bin in collection of discovered entity bins 218 with an entry in alignment annotations by bin 230 that identifies the respective list of ranked matching candidate records, ranked from highest ranked candidate record to lowest ranked candidate record.

Figure 3:
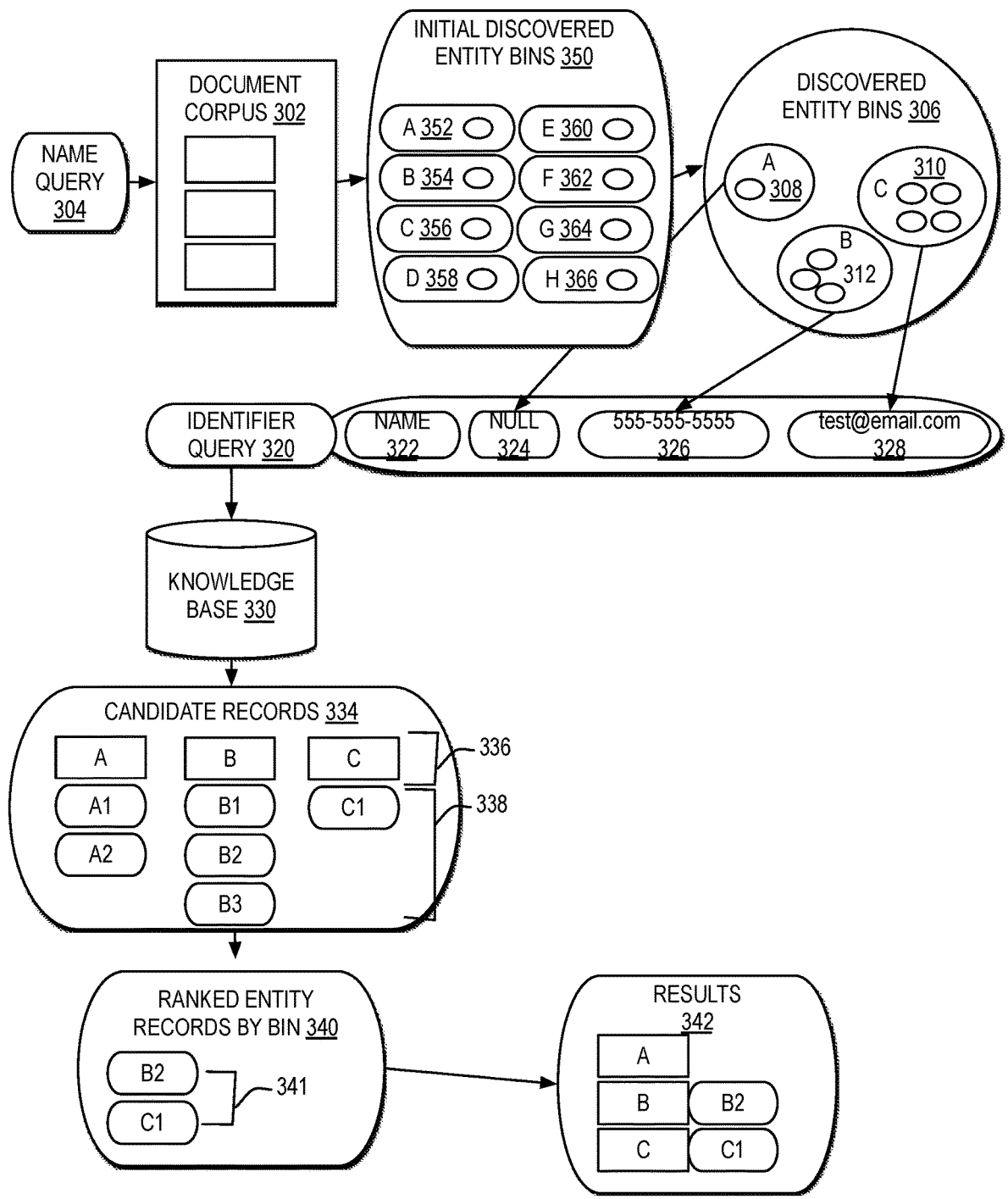
FIG. 3 is a block diagram illustrating one example of a query-directed discovery of consolidated collections of documents associated with an entity name in entity bins and alignment of entity bins to structured data sources for a particular name query.

FIG. 3 illustrates a block diagram of one example of a query-directed discovery of consolidated collections of documents associated with an entity name in entity bins and alignment of entity bins to structured data sources for a particular name query.

In one example, entity discovery system 130 searches document corpus 302 for a user submitted name query 304. In the example, document corpus 302 includes multiple unstructured documents. In the example, bin control 122 receives an initial collection of documents identified by entity discovery system 130 in document corpus 302 including mentions of at least a name element in name query 304, organizes the documents initially into initial discovered entity bins 350, with each entity bin including a single document. For example, initial discovered entity bins 350 initially includes eight entity bins, each including a single document, as illustrated by entity bins identified as bin A 352, bin B 354, bin C 356, bin D 358, bin E 360, bin F 362, bin G 364, and bin H 366. In the example, bin similarity controller 212 identifies pairs of entity bins that are similar within initial discovered entity bins 350 and bin merging controller 214 manages merging of pairs of entity bins with a degree of similarity that meets similarity threshold rules 213. In one example, discovery entity bins 306 illustrates a resulting selection of merged entity bins by bin merging controller 214, including three entity bins identified by bin A 308, bin B 312, and bin C 310. In the example, bin A 308 is an unmerged entity bin, from bin A 352, bin B 312 is a merged entity bin with three documents such as from bin B 354, bin E 360 and bin F 362, and bin C 310 is a merged entity bin with four documents such as from bin C 356, bin D 358, bin G 364, and bin H 366.

In the example, bin alignment controller 216 extract identifiers by bin, illustrated as an identifier component of "null" 324 from bin A 308, an identifier component of a telephone number of "555-555-5555" 326 from bin B 312, and an identifier component of an email address of "test@email.com" 328 from bin C 310. In the example, bin alignment controller 216 searches knowledge base 330 with an identifier query 320 including a name element 322 from name query 304, along with separately searching for each of the identifier components with the name. In the example, bin alignment controller 216 collects the results of the search for each identifier, by bin, in candidate records 334. For example, for each of entity bins A, B, and C, as illustrated at reference numeral 336, a selection of candidate records discovered including mentions of the name component and identifier component for each entity bin are illustrated at reference numeral 338. For example, as illustrated in candidate records 334, candidate records A1 and A2 are discovered for bin A, candidate records B1, B2, and B3 are discovered for bin B, and candidate record C1 is discovered for bin C.

In the example, bin alignment controller 216 evaluates each record in candidate records 334 by alignment threshold rules 228, determines highest ranking records by bin that also exceeds threshold requirements, illustrated at reference numeral 341 by candidate records B2 and C1 in ranked entity records by bin 340. In the example, bin alignment controller 216 aligns ranked entity records by bin 340 with discovered entity bins 306 and returns results 342 with bin A 308, with no aligned entity record, bin B 312 with an aligned entity record B2, and bin C 310 with an aligned entity record C1. In the example, because candidate records A1 and A2 do not exceed threshold requirements of alignment threshold rules 228, bin A in rules 342 does not include an alignment with an externally source structured record.

In the example, by aligning discovered entity bins 306, each including a distinct collection of one or more unstructured documents with mentions of a name element, with highly ranked structured records including identifier components matching the identifier components identified in the unstructured documents, retrieved from a knowledge base that uniquely identifies named entities in structured records, bin control 122 manages disambiguation of the particular named entity associated with each discovered entity bin a high degree of precision. In the example, adjusting similarity threshold rules 213 and alignment threshold rules 228, may further impact the degree of precision of named entity disambiguation and may also impact the levels of processing and network resources required for performing the named entity disambiguation process.

Figure 4:
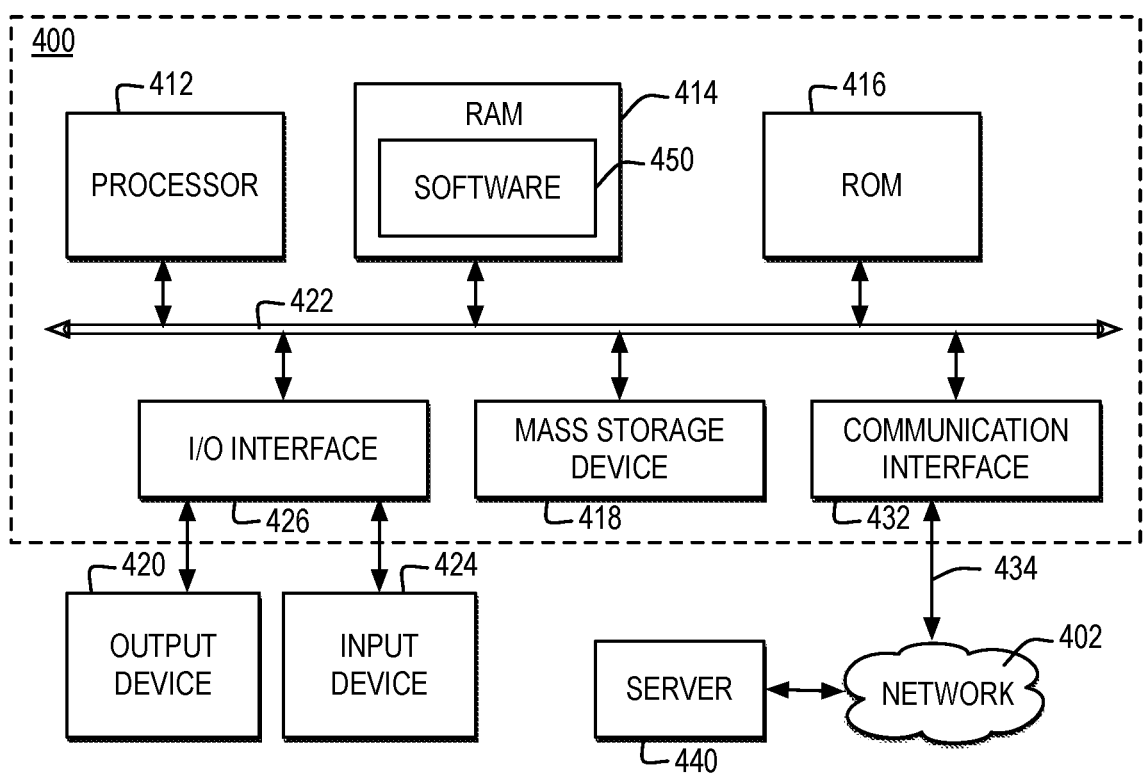
FIG. 4 is a block diagram illustrating one example of a computer system in which one embodiment of the invention may be implemented.

FIG. 4 illustrates a block diagram of one example of a computer system in which one embodiment of the invention may be implemented. The present invention may be performed in a variety of systems and combinations of systems, made up of functional components, such as the functional components described with reference to a computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. In one embodiment, when implemented as a server or node, computer system 400 includes multiple processors designed to improve network servicing power.

In one embodiment, processor 412 is at least one general-purpose processor that, during normal operation, processes data under the control of software 450, which includes at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. In one embodiment, software 450 includes, but is not limited to, code, applications, protocols, interfaces, and processes for controlling one or more systems within a network including, but not limited to, an adapter, a switch, a server, a cluster system, and a grid environment.

In one embodiment, computer system 400 communicates with a remote computer, such as server 440, or a remote client. In one example, server 440 is connected to computer system 400 through any type of network, such as network 402, through a communication interface, such as network interface 432, or over a network link connected, for example, to network 402.

In one embodiment, multiple systems within a network environment are communicatively connected via network 402, which is the medium used to provide communications links between various devices and computer systems communicatively connected. Network 402 includes permanent connections such as wire or fiber optics cables and temporary connections made through telephone connections and wireless transmission connections, for example, and may include routers, switches, gateways and other hardware to enable a communication channel between the systems connected via network 402. Network 402 represents one or more of packet-switching based networks, telephony based networks, broadcast television networks, local area and wire area networks, public networks, and restricted networks.

Network 402 and the systems communicatively connected to computer 400 via network 402 implement one or more layers of one or more types of network protocol stacks which may include one or more of a physical layer, a link layer, a network layer, a transport layer, a presentation layer, and an application layer. For example, network 402 implements one or more of the Transmission Control Protocol/Internet Protocol (TCP/IP) protocol stack or an Open Systems Interconnection (OSI) protocol stack. In addition, for example, network 402 represents the worldwide collection of networks and gateways that use the TCP/IP suite of protocols to communicate with one another. Network 402 implements a secure HTTP protocol layer or other security protocol for securing communications between systems.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

Figure 5:
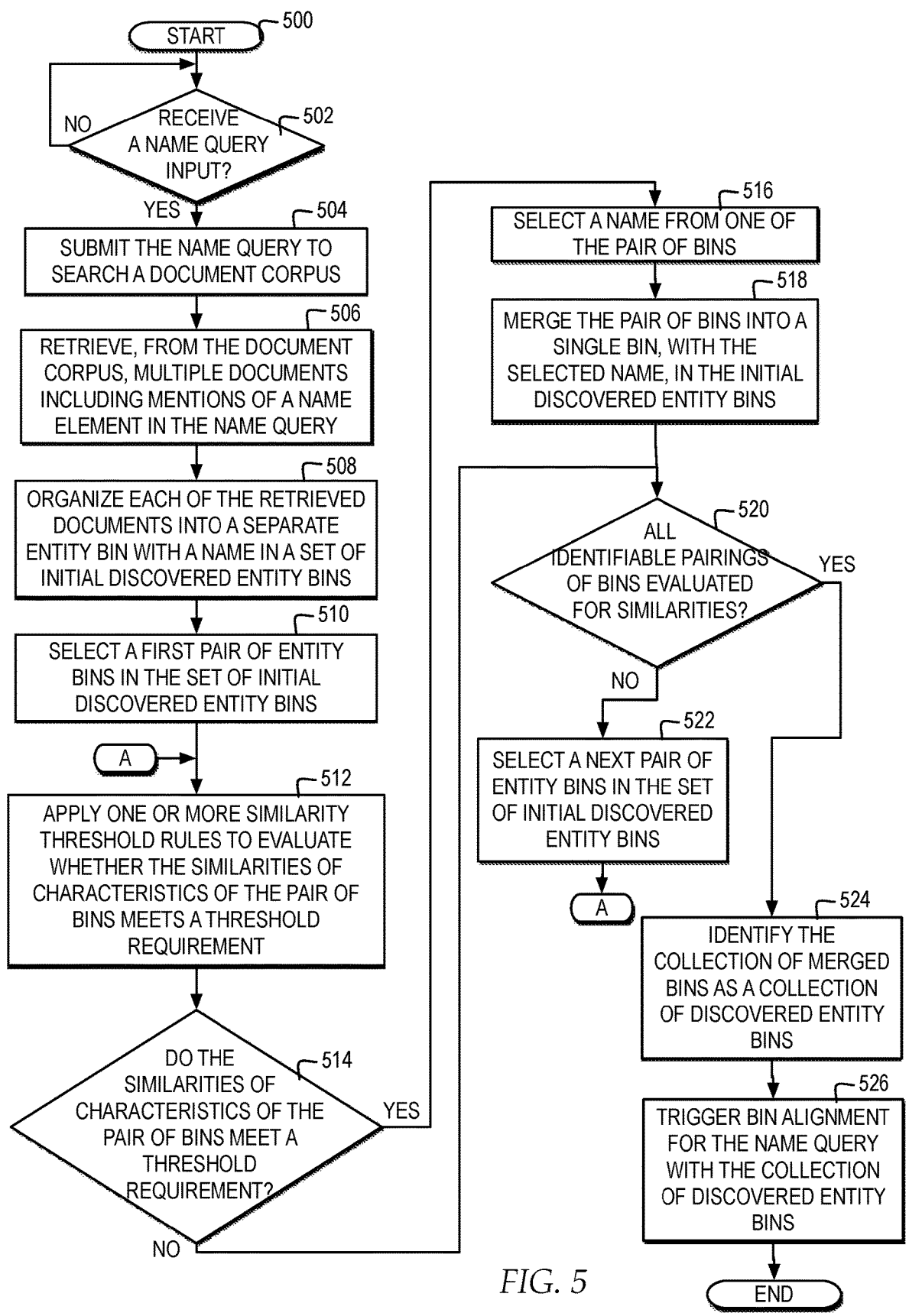
FIG. 5 illustrates a high level logic flowchart of a process and computer program for query-directed discovery of consolidated collections of document passages associated with an entity name in entity bins for entity disambiguation.
Figure 6:
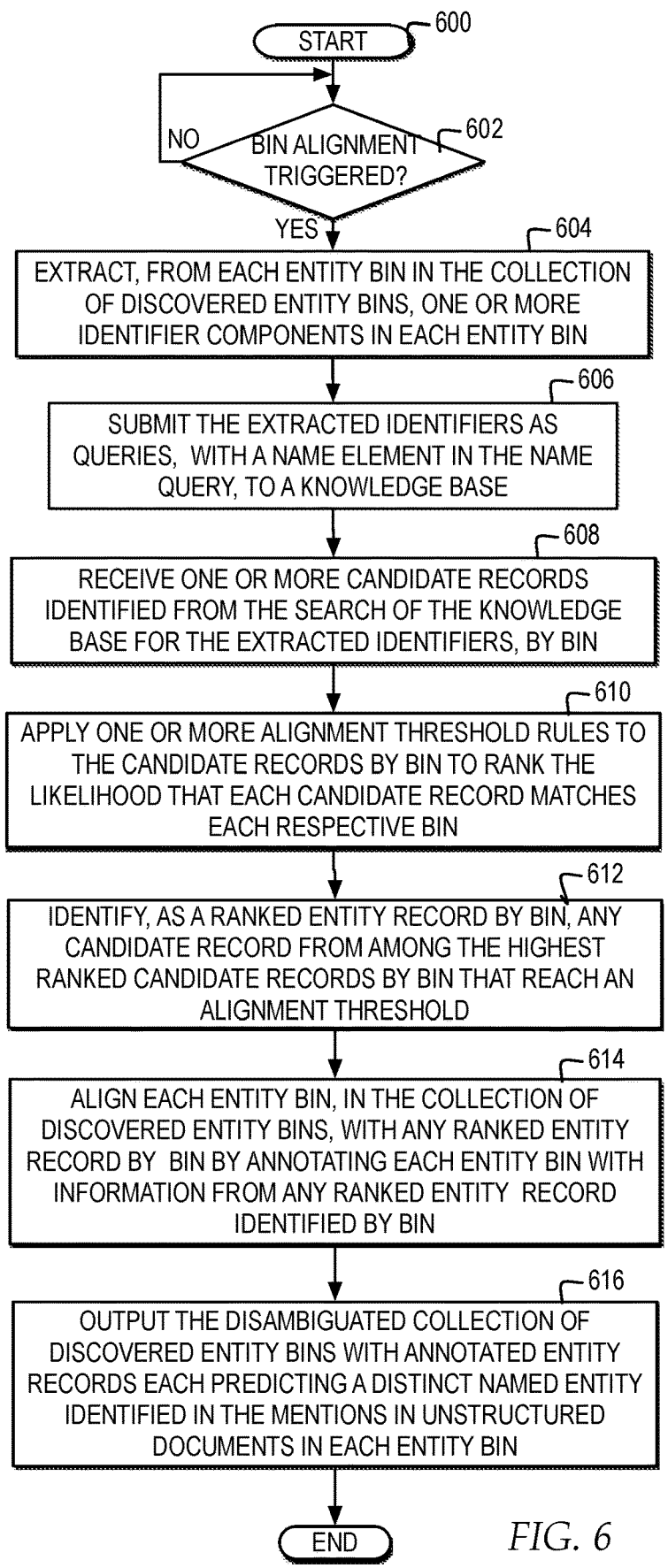
FIG. 6 illustrates a high level logic flowchart of a process and computer program for query-directed alignment of entity bins to structured data sources for improving named entity disambiguation precision.

In one embodiment, the operations performed by processor 412 control the operations of flowchart of FIGS. 5-6 and other operations described herein. In one embodiment, operations performed by processor 412 are requested by software 450 or other code or the steps of one embodiment of the invention might be performed by specific hardware components that contain hardwired logic for performing the steps, or by any combination of programmed computer components and custom hardware components. In one embodiment, one or more components of computer system 400, or other components, which may be integrated into one or more components of computer system 400, contain hardwired logic for performing the operations of flowcharts in FIGS. 5-6.

In one embodiment, computer system 400 includes multiple peripheral components that facilitate input and output. These peripheral components are connected to multiple controllers, adapters, and expansion slots, such as input/output (I/O) interface 426, coupled to one of the multiple levels of bus 422. For example, input device 424 includes, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 4, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 4 may vary. Furthermore, those of ordinary skill in the art will appreciate that the depicted example is not meant to imply architectural limitations with respect to the present invention.

FIG. 5 illustrates a high level logic flowchart of a process and computer program for query-directed discovery of consolidated collections of document passages associated with an entity name in entity bins for entity disambiguation.

In the example, the process and computer program starts at block 500 and thereafter proceeds to block 502. Block 502 illustrates a determination whether a name query input is received. At block 502, if a query system receives a name query input, then the process passes to block 504. Block 504 illustrates submitting the name query to search a document corpus. Next, block 506 illustrates retrieving, from the document corpus, multiple documents including mentions of a name element in the name query as a result of the search. Thereafter, block 508 illustrates organizing each of the retrieved documents into a separate entity bin with a name in a set of initially discovery entity bins. Next, block 510 illustrates selecting a first pair of entity bins in the set of initial discovered entity bins. Thereafter, block 512 illustrates applying one or more similarity threshold rules to evaluate whether the similarities and characteristics of the pair of entity bins meets a threshold requirement, and the process passes to block 514.

Block 514 illustrates a determination whether the similarities of characteristics of the pair of entity bins meet a threshold requirement. At block 514, if the similarities of characteristics of the pair of entity bins meet a threshold requirement, then the process passes to block 516. Block 516 illustrates selecting a name from one of the pair of entity bins. Next, block 518 illustrates merging the pair of entity bins into a single entity bin, with the selected name, in the initial discovered entity bins, and the process passes to block 520. Returning to block 514, at block 514, if the similarities of characteristics of the pair of entity bins do not meet a threshold requirement, then the process passes to block 520.

Block 520 illustrate a determination whether all identifiable pairings of entity bins have been evaluated for similarities. At block 520, if not all identifiable pairings of entity bins have been evaluated for similarities, then the process passes to block 522. Block 522 illustrates selecting a next pair of entity bins in the set of initial discovered entity bins, and the process returns to block 512.

Returning to block 520, at block 520, if all identifiable pairings of entity bins have been evaluated for similarities, then the process passes to block 524. Block 524 illustrates identifying the collection of merged entity bins as a collection of discovered entity bins. Next, block 526 illustrates triggering bin alignment for the name query with the collection of discovered entity bins, and the process ends.

FIG. 6 illustrates a high level logic flowchart of a process and computer program for query-directed alignment of entity bins to structured data sources for improving named entity disambiguation precision.

In the example the process and computer program starts at block 600, and there after proceeds to block 602. Block 602 illustrates a determination whether bin alignment is triggered. At block 602, if bin alignment is triggered then the process passes to block 604. Block 604 illustrates extracting, from each entity bin in the collection of discovered entity bins, one or more identifier components in each entity bin. Next, block 606 illustrates submitting the extracted identifiers as queries, with a name element in the name query, to a knowledge base. Thereafter, block 608 illustrates receiving one or more candidate records identified from the search of the knowledge base for the extracted identifiers, by bin. Next, block 610 illustrates applying one or more alignment threshold rules to the candidate records by bin to rank the likelihood that each candidate record matches each respective bin. Thereafter, block 612 illustrates identifying, as a ranked entity record by bin, any candidate record from among the highest ranked candidate records by bin that reaches an alignment threshold. Next, block 614 illustrates aligning each entity bin, in the collection of discovered entity bins, with any ranked entity record by bin, by annotating each entity bin with information from any ranked entity record identified by bin. Thereafter, block 616 illustrates outputting the disambiguated collection of discovered entity bins with annotated entity records each predicting a distinct named entity identified in the mentions in unstructured documents in each entity bin, and process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
    receiving, by a computer system, a collection of a plurality of discovered entity bins, each of the plurality of discovered entity bins comprising one or more unstructured documents each comprising one or more mentions of a name element from a name query, each of the plurality of discovered entity bins identified with a particular named entity from among a plurality of named entities identifiable from the name element;
    identifying, by the computer system, from a knowledge base of a plurality of structured documents, for each of one or more identifier components with the name element, a plurality of candidate records identifying the respective one or more identifier components with the name element, the one or more identifier components identified among the plurality of discovery entity bins;
    applying, by the computer system, for each respective selection of the plurality of candidate records associated with each of the plurality of discovered entity bins, one or more alignment threshold rules to rank the likelihood that each candidate record within each respective selection matches one or more characteristics of the respective discovery entity bin;
    aligning, by the computer system, with each of the plurality of discovery entity bins, a highest ranked record from among each respective selection of the plurality of candidate records; and
    outputting, by the computer system, the plurality of discovered entity bins each annotated with the respective aligned highest ranked record identifying a distinct named entity from among the plurality of named entities.

2. The method according to claim 1, further comprising:
    receiving, by the computer system, the name query from a user, the name query comprising the name element; and
    only identifying, by the computer system, the collection of the plurality of discovery entity bins in response to receiving the name query from the user.

3. The method according to claim 1, further comprising:
    responsive to receiving the name query, searching, by the computer system, a document corpus comprising a plurality of unstructured documents for the name element from the name query;
    responsive to identifying a selection of documents of the plurality of unstructured documents each comprising one or more mentions of the name element, organizing, by the computer system, each separate document in the selection of documents into a separate entity bin from among a plurality of entity bins, each separate entity bin assigned a separate name label;
    applying, by the computer system, to each pairing of entity bins of the plurality of entity bins, one or more similarity threshold rules to evaluate whether one or more similarities in characteristics in each pairing of entity bins meets a threshold requirement; and
    merging, by the computer system, each identified pairing of entity bins with one or more similarities in characteristics in the respective pairing of entity bins meeting the threshold requirement into a single entity bin.

4. The method according to claim 3, wherein merging, by the computer system, each identified pairing of entity bins with one or more similarities in characteristics in the respective pairing of entity bins meeting the threshold requirement into a single entity bin further comprises:
    selecting, by the computer system, a particular name label from among the respective name labels assigned to each entity in a respective identified pairing of entity bins;
    labeling, by the computer system, the single entity bin with the selected particular name; and
    adding, by the computer system, one or more remaining name labels from among the respective name labels as an alternate name to the single entity bin.

5. The method according to claim 1, wherein identifying, by the computer system, from a knowledge base of a plurality of structured documents, for each of one or more identifier components with the name element, a plurality of candidate records identifying the respective one or more identifier components with the name element, the one or more identifier components identified among the plurality of discovered entity bins further comprises:
    extracting, by the computer system, from each of the plurality of discovered entity bins, one or more identifier components in the respective one or more unstructured documents in each of the plurality of discovery entity bins; and
    identifying, by the computer system, from the knowledge base, for each of the one or more identifier components with the name element, the plurality of candidate records identifying the respective one or more identifier components with the name element, the knowledge base comprising the plurality of structured documents each identifying a distinct named entity from among the plurality of named entities.

6. The method according to claim 1, wherein aligning, by the computer system, with each of the plurality of discovery entity bins, a highest ranked record from among each respective selection of the plurality of candidate records further comprises:

comparing, by the computer system, the ranked likelihood that each record within each respective selection matches one or more characteristics of the respective discovery entity bin with an alignment threshold;

only identifying, by the computer system, the respective highest ranked record from among the respective selection of the plurality of candidate records if a ranking of the highest ranked record exceeds the alignment threshold; and aligning, by the computer system, with each of the plurality of discovery entity bins, the respective highest ranked record from among the respective selection of the plurality of candidate records.

7. The method according to claim 1, wherein aligning, by the computer system, with each of the plurality of discovery entity bins, a highest ranked record from among each respective selection of the plurality of candidate records further comprises:

identifying, by the computer system, based on the ranked likelihood that each record within each respective selection matches one or more characteristics of the respective discovery entity bin, a ranked list of each respective selection of the plurality of records associated with each of the plurality of discovered entity bins;

aligning, by the computer system, with each of the plurality of entity bins, the respective ranked list of each respective selection of the plurality of records.

8. The method according to claim 1, wherein outputting, by the computer system, the plurality of discovered entity bins each annotated with the respective aligned highest ranked record identifying a distinct named entity from among the plurality of named entities further comprises:

outputting, by the computer system, the plurality of discovered entity bins discovered from a document corpus of unstructured document accessible independent of the knowledge base.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to receive a collection of a plurality of discovered entity bins, each of the plurality of discovered entity bins comprising one or more unstructured documents each comprising one or more mentions of a name element from a name query, each of the plurality of discovered entity bins identified with a particular named entity from among a plurality of named entities identifiable from the name element;

program instructions to identify, from a knowledge base of a plurality of structured documents, for each of one or more identifier components with the name element, a plurality of candidate records identifying the respective one or more identifier components with the name element, the one or more identifier components identified among the plurality of discovery entity bins;

program instructions to apply, for each respective selection of the plurality of candidate records associated with each of the plurality of discovered entity bins, one or more alignment threshold rules to rank the likelihood that each candidate record within each respective selection matches one or more characteristics of the respective discovery entity bin;

program instructions to align, with each of the plurality of discovery entity bins, a highest ranked record from among each respective selection of the plurality of candidate records; and program instructions to output the plurality of discovered entity bins each annotated with the respective aligned highest ranked record identifying a distinct named entity from among the plurality of named entities.

10. The computer system according to claim 9, the program instructions further comprising:

program instructions to receive the name query from a user, the name query comprising the name element; and program instructions to only identify the collection of the plurality of discovery entity bins in response to receiving the name query from the user.

11. The computer system according to claim 9, the program instructions further comprising:

program instructions, responsive to receiving the name query, to search a document corpus comprising a plurality of unstructured documents for the name element from the name query;

program instructions, responsive to identifying a selection of documents of the plurality of unstructured documents each comprising one or more mentions of the name element, to organize each separate document in the selection of documents into a separate entity bin from among a plurality of entity bins, each separate entity bin assigned a separate name label;

program instructions to apply to each pairing of entity bins of the plurality of entity bins, one or more similarity threshold rules to evaluate whether one or more similarities in characteristics in each pairing of entity bins meets a threshold requirement; and program instructions to merge each identified pairing of entity bins with one or more similarities in characteristics in the respective pairing of entity bins meeting the threshold requirement into a single entity bin.

12. The computer system according to claim 11, the program instructions further comprising:

program instructions to select a particular name label from among the respective name labels assigned to each entity in a respective identified pairing of entity bins;

program instructions to label the single entity bin with the selected particular name; and program instructions to add one or more remaining name labels from among the respective name labels as an alternate name to the single entity bin.

13. The computer system according to claim 9, the program instructions further comprising:

program instructions to extract, from each of the plurality of discovered entity bins, one or more identifier components in the respective one or more unstructured documents in each of the plurality of discovery entity bins; and program instructions to identify, from the knowledge base, for each of the one or more identifier components with the name element, the plurality of candidate records identifying the respective one or more identifier components with the name element, the knowledge base comprising the plurality of structured documents each identifying a distinct named entity from among the plurality of named entities.

14. The computer system according to claim 9, the program instructions further comprising:
  program instructions to compare the ranked likelihood that each record within each respective selection matches one or more characteristics of the respective discovery entity bin with an alignment threshold;
  program instructions to only identify the respective highest ranked record from among the respective selection of the plurality of candidate records if a ranking of the highest ranked record exceeds the alignment threshold; and
  program instructions to align, with each of the plurality of discovery entity bins, the respective highest ranked record from among the respective selection of the plurality of candidate records.

15. The computer system according to claim 9, the program instructions further comprising:
  program instructions to identify, based on the ranked likelihood that each record within each respective selection matches one or more characteristics of the respective discovery entity bin, a ranked list of each respective selection of the plurality of records associated with each of the plurality of discovered entity bins;
  program instructions to align, with each of the plurality of entity bins, the respective ranked list of each respective selection of the plurality of records.

16. The computer system according to claim 9, the program instructions further comprising:
  program instructions to output the plurality of discovered entity bins discovered from a document corpus of unstructured document accessible independent of the knowledge base.

17. A computer program product comprises a computer readable storage medium having program instructions embodied therewith, wherein the computer readable storage medium is not a transitory signal per se, the program instructions executable by a computer to cause the computer to:
  receive, by a computer, a collection of a plurality of discovered entity bins, each of the plurality of discovered entity bins comprising one or more unstructured documents each comprising one or more mentions of a name element from a name query, each of the plurality of discovered entity bins identified with a particular named entity from among a plurality of named entities identifiable from the name element;
  identify, by the computer, from a knowledge base of a plurality of structured documents, for each of one or more identifier components with the name element, a plurality of candidate records identifying the respective one or more identifier components with the name element, the one or more identifier components identified among the plurality of discovery entity bins;
  apply, by the computer, for each respective selection of the plurality of candidate records associated with each of the plurality of discovered entity bins, one or more alignment threshold rules to rank the likelihood that each candidate record within each respective selection matches one or more characteristics of the respective discovery entity bin;
  align, by the computer, with each of the plurality of discovery entity bins, a highest ranked record from among each respective selection of the plurality of candidate records; and
  output, by the computer, the plurality of discovered entity bins each annotated with the respective aligned highest ranked record identifying a distinct named entity from among the plurality of named entities.

18. The computer program product according to claim 17, further comprising the program instructions executable by a computer to cause the computer to:
  receive, by the computer, the name query from a user, the name query comprising the name element; and
  only identifying, by the computer, the collection of the plurality of discovery entity bins in response to receiving the name query from the user.

19. The computer program product according to claim 17, further comprising the program instructions executable by a computer to cause the computer to:
  responsive to receiving the name query, search, by the computer, a document corpus comprising a plurality of unstructured documents for the name element from the name query;
  responsive to identifying a selection of documents of the plurality of unstructured documents each comprising one or more mentions of the name element, organize, by the computer, each separate document in the selection of documents into a separate entity bin from among a plurality of entity bins, each separate entity bin assigned a separate name label;
  apply, by the computer, to each pairing of entity bins of the plurality of entity bins, one or more similarity threshold rules to evaluate whether one or more similarities in characteristics in each pairing of entity bins meets a threshold requirement; and
  merge, by the computer, each identified pairing of entity bins with one or more similarities in characteristics in the respective pairing of entity bins meeting the threshold requirement into a single entity bin.

20. The computer program product according to claim 17, further comprising the program instructions executable by a computer to cause the computer to:
  extract, by the computer, from each of the plurality of discovered entity bins, one or more identifier components in the respective one or more unstructured documents in each of the plurality of discovery entity bins; and
  identify, by the computer, from the knowledge base, for each of the one or more identifier components with the name element, the plurality of candidate records identifying the respective one or more identifier components with the name element, the knowledge base comprising the plurality of structured documents each identifying a distinct named entity from among the plurality of named entities.

* * * * *